Figure 1:
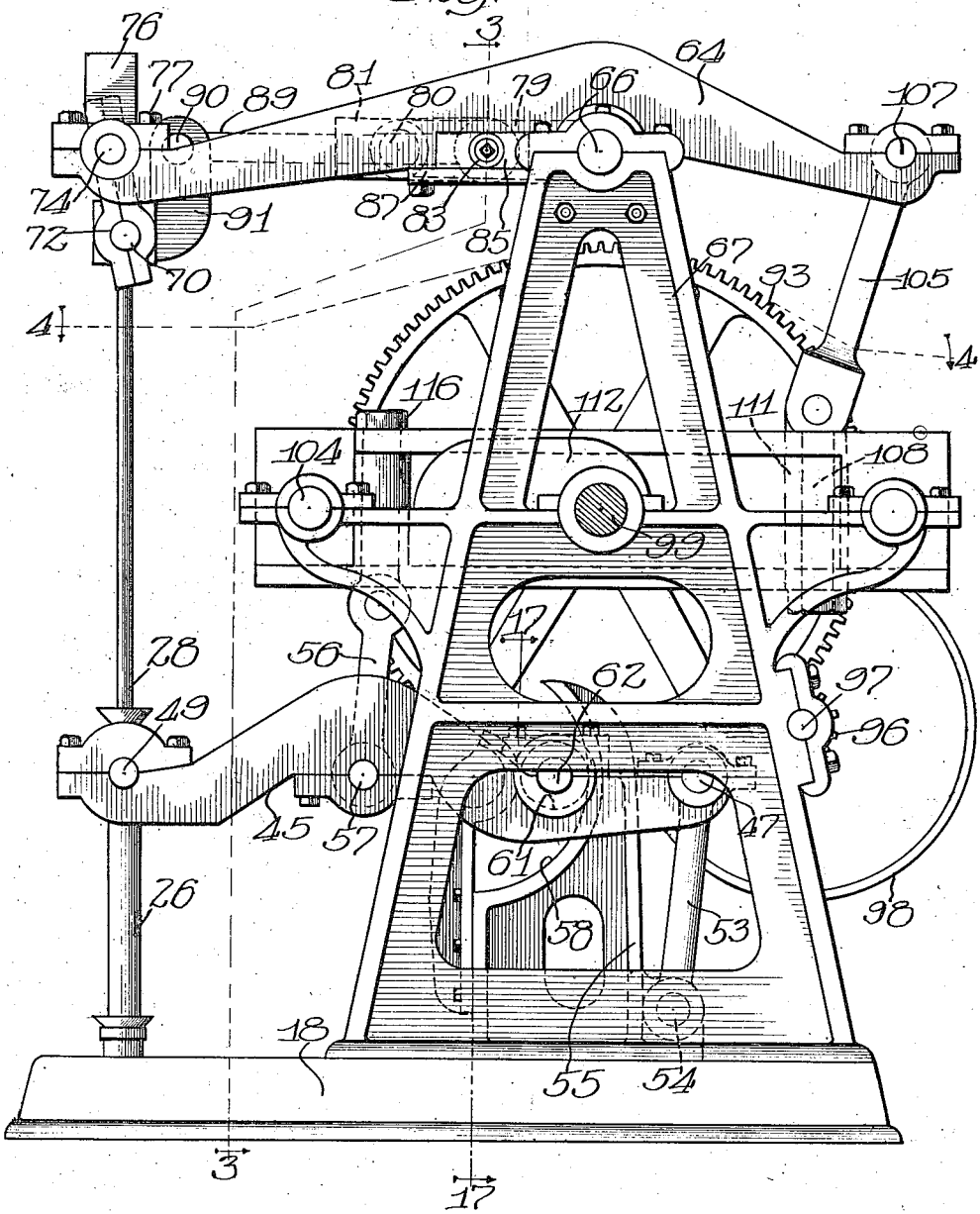

M. T. CHAPMAN.
PUMPING MACHINERY.
APPLICATION FILED DEC. 26, 1911.

1,174,121.

Patented Mar. 7, 1916.
8 SHEETS—SHEET 1.

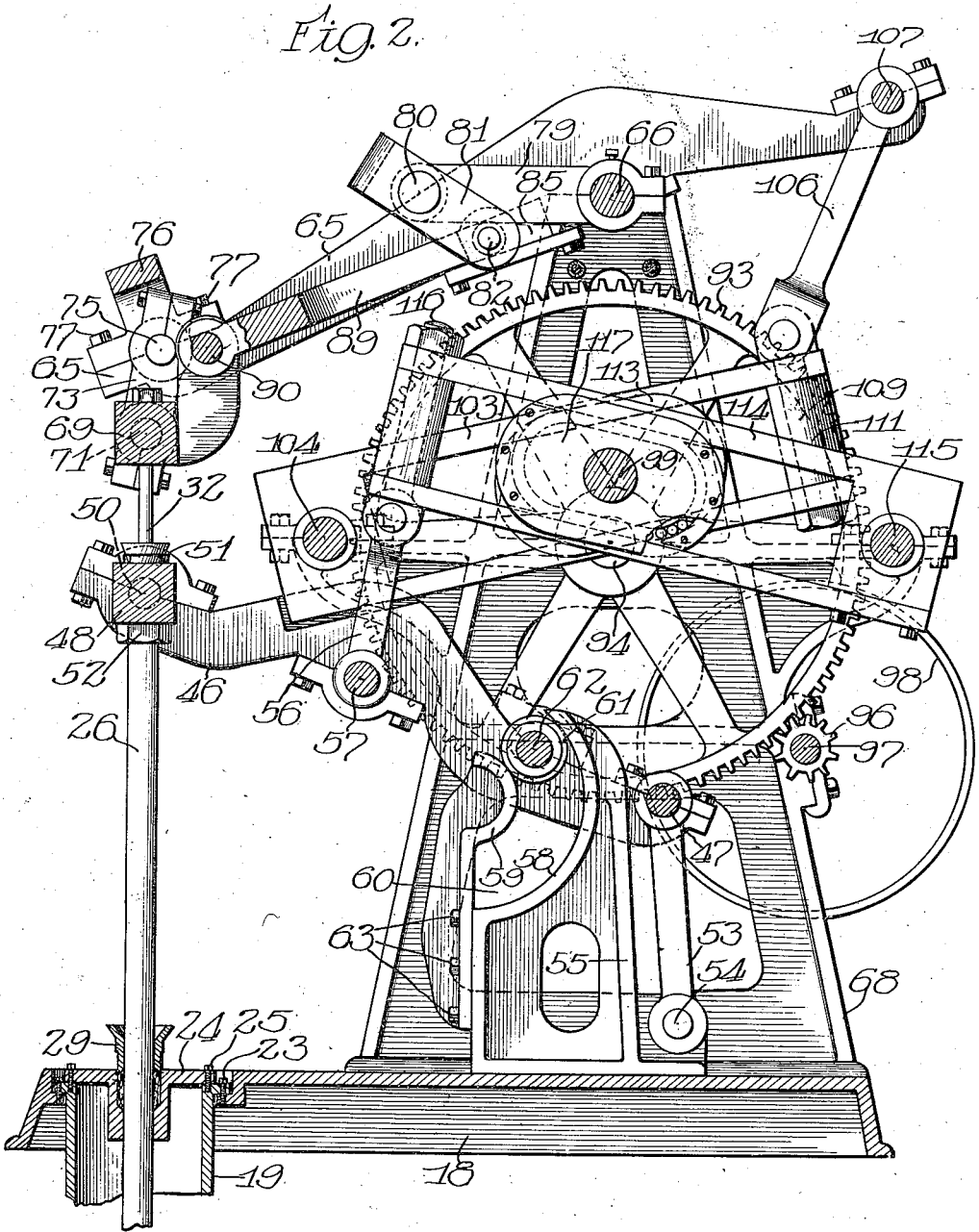

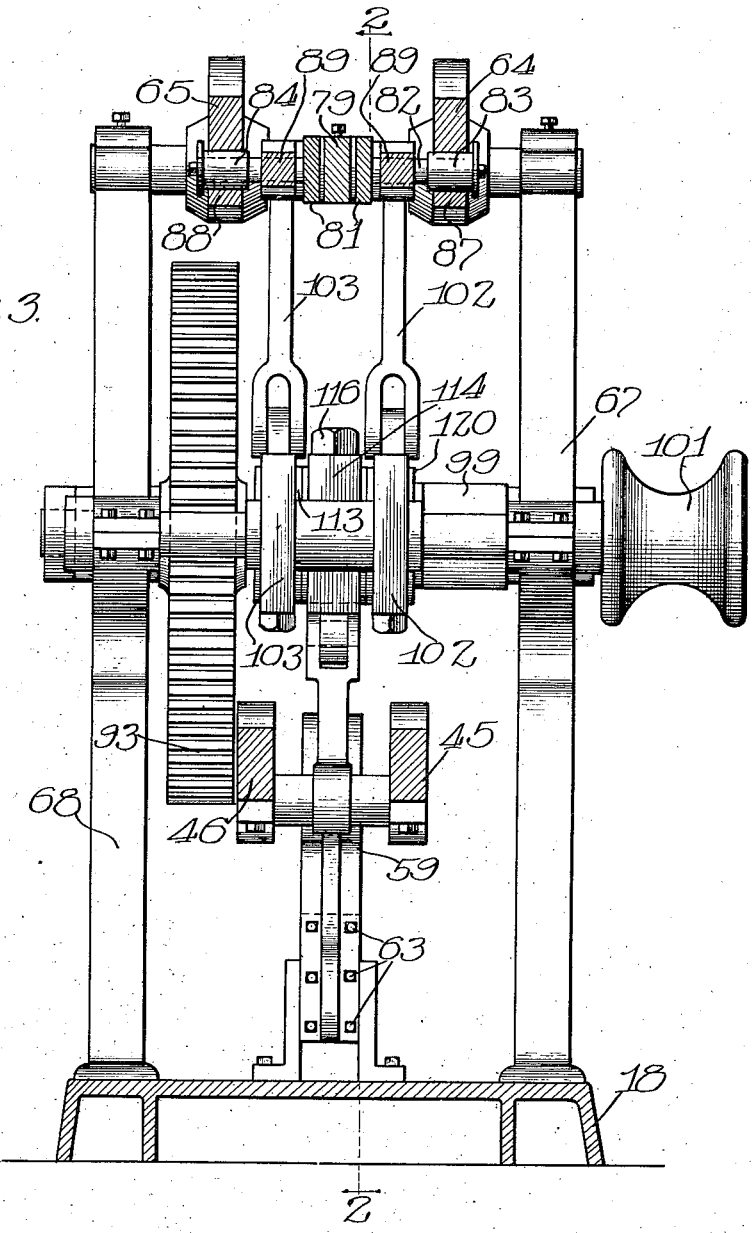

M. T. CHAPMAN.
PUMPING MACHINERY.
APPLICATION FILED DEC. 26, 1911.
1,174,121.
Patented Mar. 7, 1916.
8 SHEETS—SHEET 4.
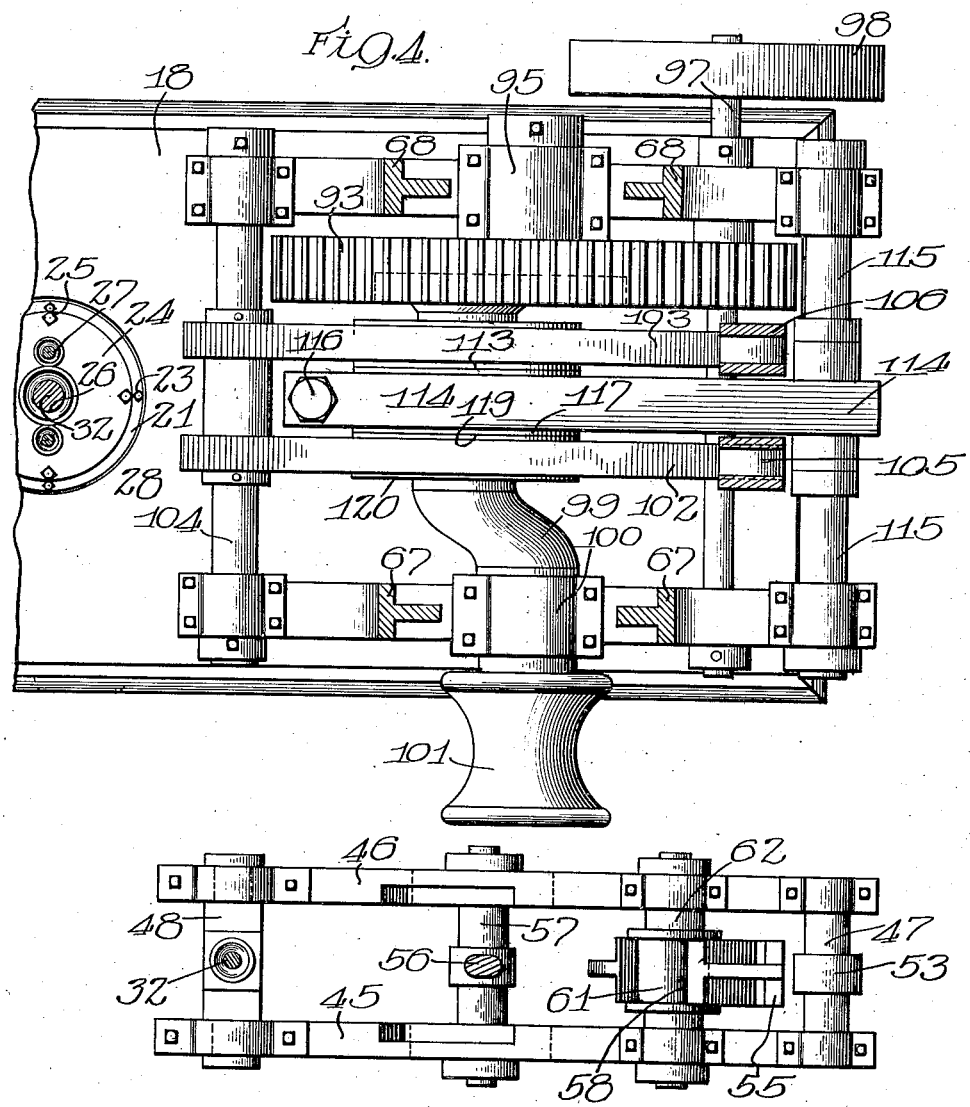

M. T. CHAPMAN.
PUMPING MACHINERY.
APPLICATION FILED DEC. 26, 1911.
1,174,121.
Patented Mar. 7, 1916.
8 SHEETS—SHEET 5.
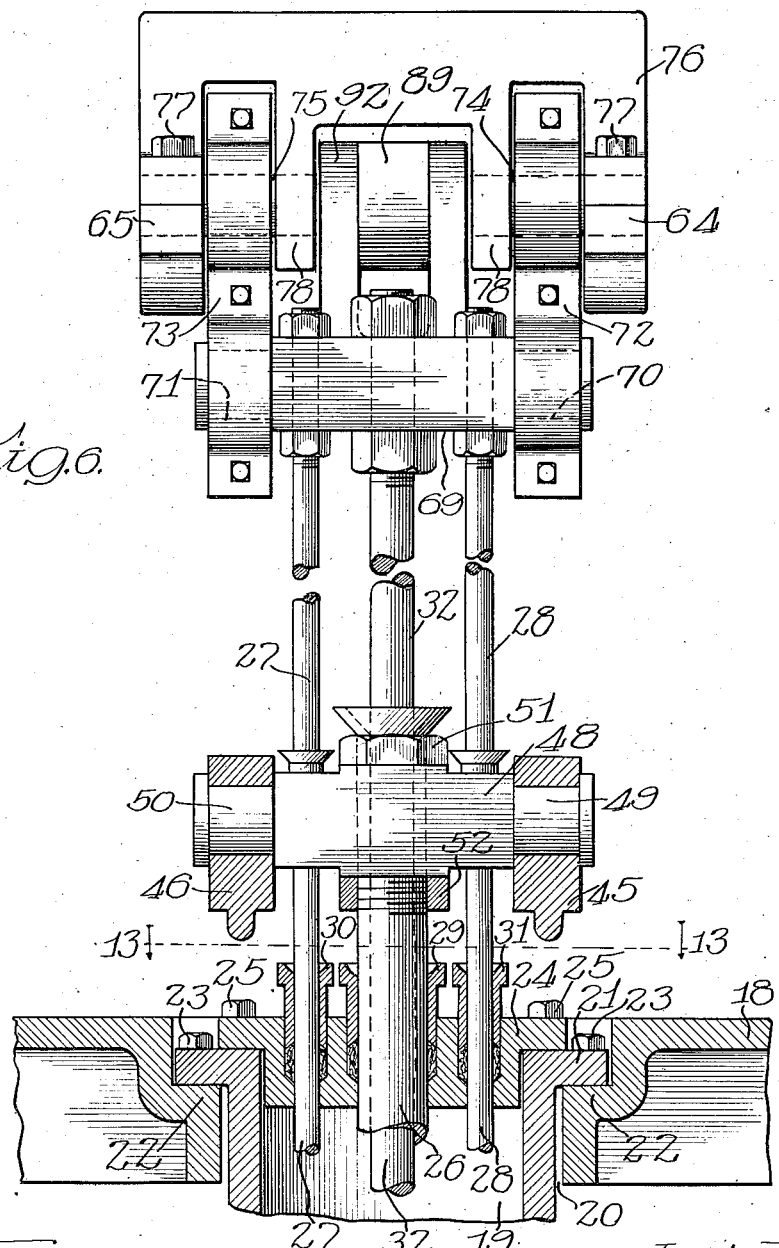

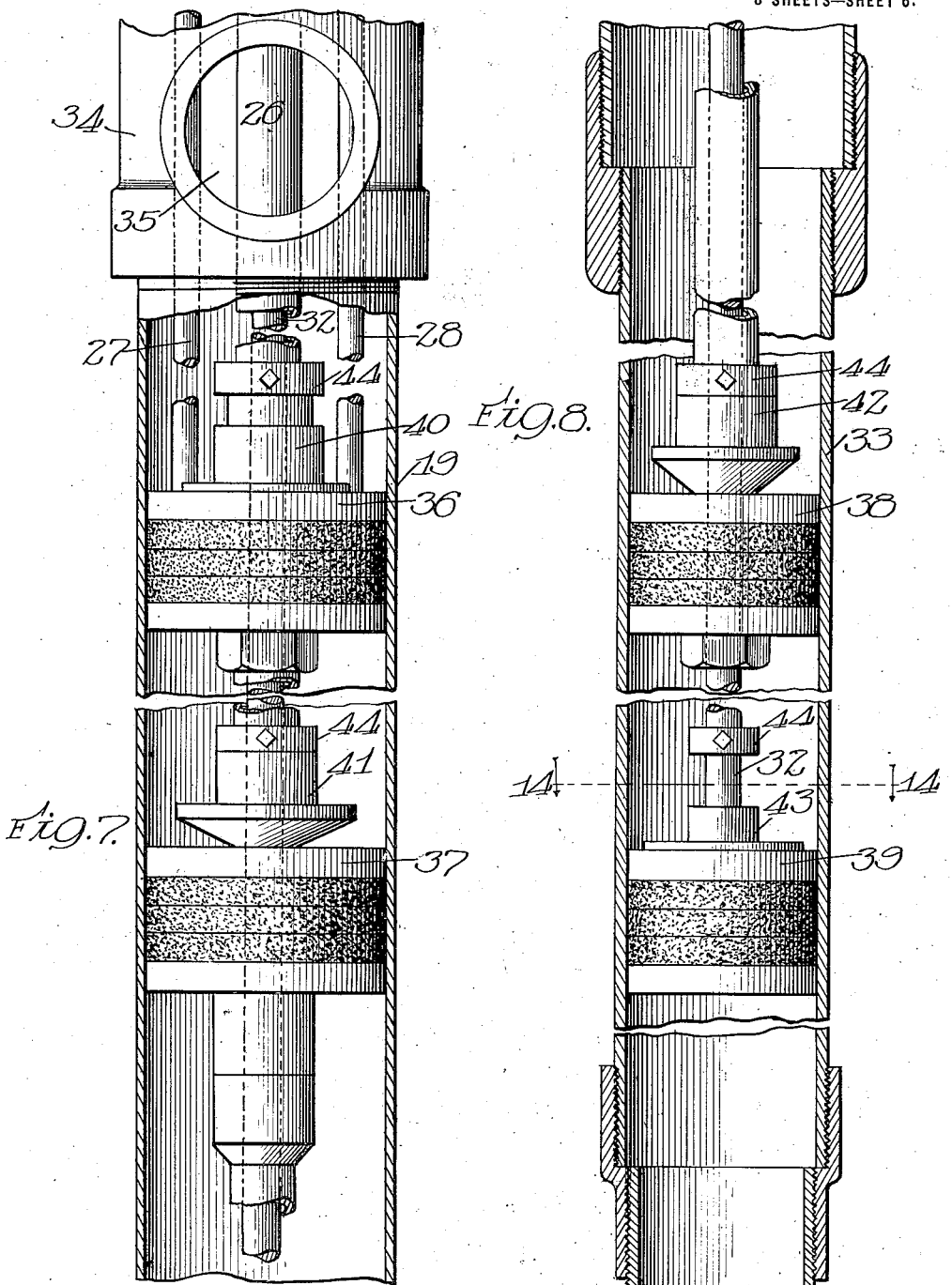

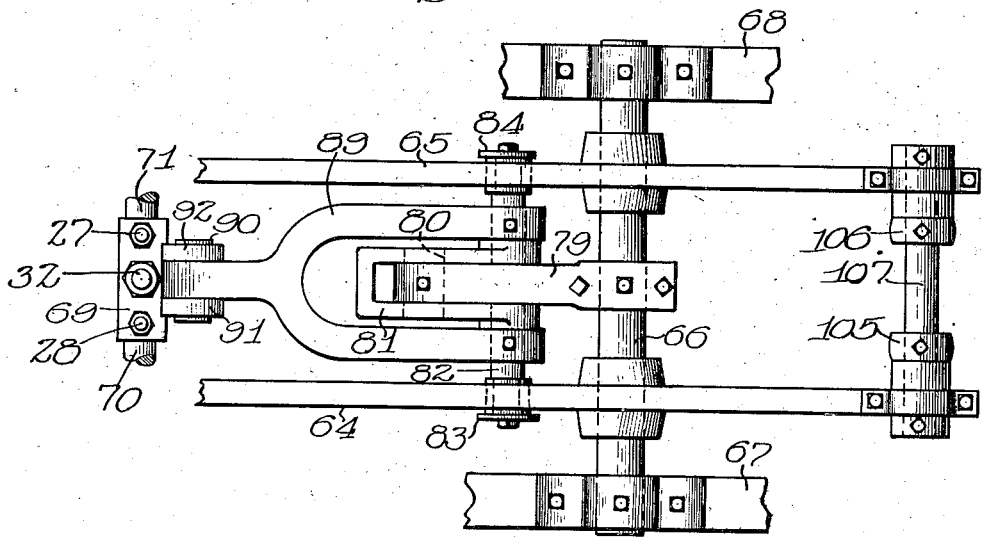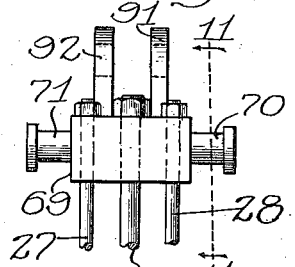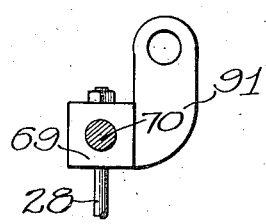

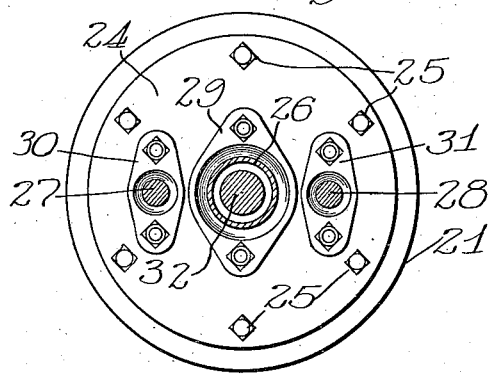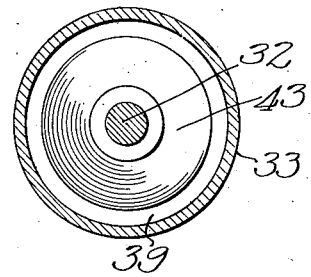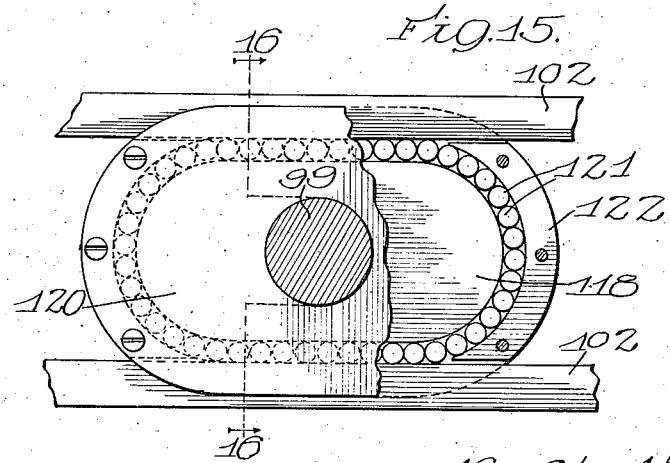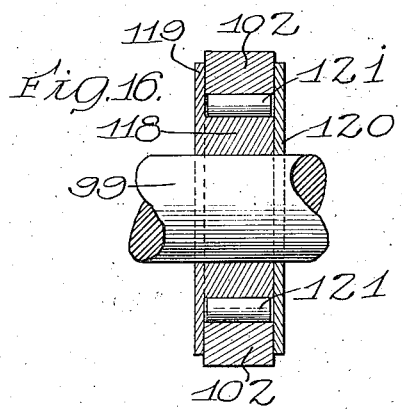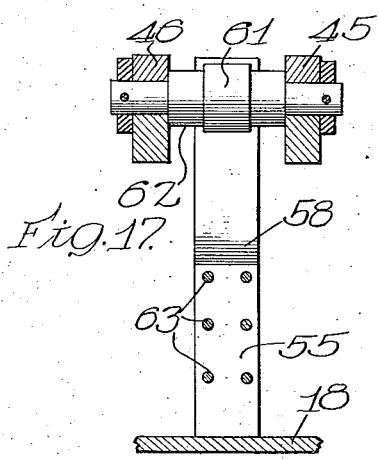

UNITED STATES PATENT OFFICE.

MATTHEW T. CHAPMAN, OF AURORA, ILLINOIS, ASSIGNOR TO THE AMERICAN WELL WORKS, OF AURORA, ILLINOIS, A CORPORATION OF ILLINOIS.

PUMPING MACHINERY.

1,174,121.   Specification of Letters Patent.   Patented Mar. 7, 1916.

Application filed December 26, 1911. Serial No. 667,886.

*To all whom it may concern:*

Be it known that I, MATTHEW T. CHAPMAN, a citizen of the United States, residing at Aurora, in the county of Cook and State of Illinois, have invented certain new and useful Improvements in Pumping Machinery, of which the following is a specification.

My invention relates to pumping machinery, and is particularly designed for use in pumping water from deep wells.

It comprises improved means operating in the well for elevating the water; improved mechanism for operating the water-elevating devices; and also certain improvements in the construction of the supporting devices for the operating mechanism and the well-tube.

The objects of my invention are to provide means by which a continuous or uninterrupted flow of water may be obtained; to provide a construction by which smaller plunger rods may be employed so that the pumping mechanism will be well adapted for use in crooked wells; to provide improved anti-friction slide bearings for certain parts of the plunger operating mechanism; to provide means for maintaining the vertical alinement of the upper portions of the plunger rods without the use of vertical guides; to provide improved means for placing the plungers in the well and removing them or the plunger rods therefrom; and to provide improved means for connecting the supports for the pump operating mechanism with the well-tube and supporting the latter so that the plungers, plunger rods, and well-tube may be lowered into the well without removing the pump operating mechanism from its foundation or support.

I accomplish these objects as illustrated in the drawings and as hereinafter described.

What I regard as new is set forth in the claims.

In the accompanying drawings, Figure 1 is a side elevation of my improved pump operating mechanism; Fig. 2 is a vertical section thereof on line 2—2 of Fig. 3; Fig. 3 is a vertical cross-section on line 3—3 of Fig. 1; Fig. 4 is a partial horizontal section on line 4—4 of Fig. 1; Fig. 5 is a plan view of the lower operating lever, some parts being in section; Fig. 6 is an enlarged detail, partly in section, illustrating the devices for connecting the upper ends of the several plunger rods with the operating mechanism and the upper end of the well-tube and connecting parts; Fig. 7 is an enlarged detail, partly in section, showing the upper portion of the well-tube and the two upper pair of plungers; Fig. 8 is an enlarged vertical section of the lower portion of the well-tube, showing the two lower plungers; Fig. 9 is a plan view, partly broken away, illustrating the upper operating lever and its connections; Fig. 10 is a detail, being a front view of the cross-head by which the upper ends of certain of the pumping rods are connected with the upper operating lever; Fig. 11 is a sectional view, taken on line 11—11 of Fig. 10; Fig. 12 is a plan view of the parts shown in Fig. 10; Fig. 13 is a horizontal section on line 13—13 of Fig. 6; Fig. 14 is a cross-section on line 14—14 of Fig. 8; Fig. 15 is a detail, partly in section, showing one of the anti-friction slide blocks which are connected with the crank of the drive-wheel and operate rocking frames by which the upper and lower levers are actuated; Fig. 16 is a vertical cross-section on line 16—16 of Fig. 15; and Fig. 17 is a sectional view on line 17—17 of Fig. 1.

Deep wells are often crooked, and consequently, in pumping from such wells, it is objectionable to use heavy pump or plunger rods since, when deflected from the vertical by the sinuosities of the well-tube, by reason of their stiffness they rub with greater or less force against the sides of the well-tube and so damage it. In order to avoid or minimize this objection, I employ two sets of plungers, the lower set being placed below the level of the standing water in the well, the lowest plunger being operated by a plunger rod of comparatively small diameter so that it is more flexible and may adapt itself to the sinuosities of the well-tube without injurious rubbing thereof. The other set of plungers is placed between the lower set and the surface, their location being somewhat dependent upon the character of the work to be done. For example, if the water is to be pumped to the surface only, they are preferably placed half way between the lower set and the surface; whereas, when the water is to be delivered to an elevation, the upper set may be placed immediately below the surface of the ground or at any other suitable depth. As the plungers of the upper set are comparatively high up in the well-tube, where it is usually straight, heavier rods may be employed for operating them. The lower plunger of the lower set and the upper plunger of the upper set are connected to operate in unison, and in like manner, the upper plunger of the lower set and the lower plunger of the upper set are operated in unison, the arrangement being such that the several plungers act to discharge the water in a continuous stream, as will be hereinafter described. The operating mechanism by which the several plungers are operated is constructed so that the two plungers of each set move in opposite directions, except that at or near the beginning of one stroke and the end of the other all the plungers move upward together, and as one gradually slows up the other gradually increases its speed until it has come up with the rising column of water, thus securing a continuous upward flow of water and preventing "water-hammer", which occurs in other constructions where there is an intermittent operation, due to the stopping and starting of the water at each up-stroke of the pump.

The general arrangement of the pump operating mechanism, the connection of the well-tube therewith, and the arrangement of the several plungers are best shown in Figs. 1, 6, 7 and 8. As therein shown, 18 indicates a foundation or base which supports the pump operating mechanism and also the upper portion of the well-tube. As shown in Fig. 6, the well-tube 19 fits at its upper end in a circular opening 20 in the foundation 18 and is provided with a peripheral flange 21 which rests upon a shoulder 22 provided on the foundation for that purpose. Bolts 23 which pass through the flange 21 into the shoulder serve to secure the well-tube in position. The latter may, however, be removed in an upward direction by removing the bolts 23. 24 indicates a cap-plate which fits in the upper end of the well-tube and is secured thereto by bolts 25, thereby closing the upper end thereof. The cap-plate 24 is provided with three passages for plunger rods 26—27—28, respectively, and with glands 29—30—31 forming stuffing-boxes around the several plunger rods, thereby preventing the escape of water around the same. As shown in Fig. 6, the plunger rod 26 is of considerably greater diameter than the rods 27—28, the latter being solid and the former tubular or hollow to permit of the passage therethrough of a solid plunger rod 32 which extends down therethrough. As shown in Figs. 7 and 8, the well-tube 19 extends down into the well and is preferably made of several sections suitably connected together, the upper section being of greater diameter than the lower section 33 to facilitate of the introduction of the plungers. The upper end of the well-tube is preferably made in the form of a T-coupling 34 having a lateral opening 35 for the discharge of the water, as shown in Fig. 7.

As has been stated, there are two sets of plungers,—36—37 being the upper and lower plungers of the upper set and 38—39 the upper and lower plungers of the lower set. The upper set operates in the larger portion of the well-tube 19, while the lower set operates in the lower and smaller portion 33 of the well-tube. The solid plunger rods 27—28 are connected to the uppermost plunger 36. The solid plunger-rod 32 extends down through the three upper plungers and is connected with the lowermost plunger 39, and the tubular plunger-rod 26 is connected with the plungers 37 and 38, which are, respectively, the lower plunger of the upper set and the upper plunger of the lower set. Each of the several plungers is provided with a check-valve, 40—41—42—43, respectively, the check valves 40—43 being shown as closed and the valves 41—42 open in Figs. 7 and 8. Said valves slide vertically, their movement being limited by collars 44, as shown. The several check-valves operate to close passages through the plungers when the plungers are lifted so that by their downward movement water may pass above them, but by their upward movement water is carried up in the well-tube.

The mechanism by which the several plungers are operated will now be described. 45—46 indicate two similar members, which are rigidly secured together and form a lever which operates the tubular plunger rod 26, as shown in Figs. 1, 5 and 6. As shown in Fig. 5, the two members 45—46 are connected together at their inner ends by a pivot-pin or shaft 47 and at their opposite ends by a cross-head 48 having journals 49—50 at its ends which fit in suitable bearings in the members 45—46, as shown in Fig. 6. The cross-head, therefore, may rock in its bearings to adjust itself to the oscillating movement of the lever. The upper end of the tubular plunger-rod 26 is securely connected to the cross-head, through which it passes, by means of nuts 51—52, as shown in Fig. 6. The bearings of the journals 49—50 are made separable so that the cross-head may readily be removed.

53 indicates a swinging link, the upper end of which is connected with the pivot 47, its lower end being pivoted upon the foundation or base 18, preferably being connected by a pivot 54 with a bracket or standard 55 secured to the base, as shown in Fig. 2. The link 53 thus forms a swinging fulcrum for the inner end of the lower operating lever 45—46.

56 indicates a link which is connected to a pivot 57 which is journaled at its ends to the two members 45—46 constituting the lower operating lever, as shown in Figs. 1 and 5. The pivot 57 is placed toward the outer end of the lever, which is operated by the link 56 through mechanism which will be hereinafter described.

The standard or bracket 55 rises from the base 18, as best shown in Fig. 2 and is provided with a curved face 58 and with a co-acting plate 59 which, together with the curved face 58, forms a curved guide 60 for the roller 61. Said roller is mounted upon a shaft 62 which is connected to the two members 45—46 of the lower operating lever near their inner ends, as shown in Fig. 5, the arrangement being such that when said lever is in operation the roller 61 travels in the guide 60. The plate 59 is preferably formed separate from the bracket 55 and is secured thereto by screws 63, as shown in Fig. 2. The shape of the guide 60 is such that when the operating lever 45—46 is rocked upon its fulcrum the lever will have an endwise movement sufficient to hold the cross-head 48 in vertical alinement with the well-tube and therefore cause the plunger-rod 26 to be reciprocated in a vertical line. 64—65 indicates two members which together form an upper operating lever. Said operating lever is pivotally mounted upon a non-rotary fulcrum or shaft 66 which is carried at the upper ends of standards 67—68 which rise at the opposite sides of the foundation 18 and support also other parts of the operating mechanism. The upper operating lever 64—65 serves to reciprocate the plunger rods 27, 28 and 32. As best shown in Fig. 6, said plunger rods are connected at their upper ends with a cross-head 69 which at its ends is provided with journals 70—71, as shown in Figs. 10 and 12. These journals are fitted in bearings provided by swinging links 72—73 which are pivoted upon and depend from pivots 74—75 (see Figs. 1 and 2) carried by a frame 76 which is secured at the outer ends of the members 64—65 comprising the upper operating lever. As best shown in Fig. 6, the frame 76 is secured at its ends upon the end portions of the members 64—65 by screws 77 and is provided with downwardly-extending flanges 78 which support the inner ends of the pivots 74—75, respectively. Thus the links 72—73 are free to swing longitudinally of the upper lever so as to permit the cross-head 69 to maintain its vertical alinement with the plunger rods. As shown in Fig. 1, the links 72 are preferably made split to facilitate their application to the journals 70—71. The cross-head 69 is positively operated to maintain its vertical alinement with the plunger rods by means of an arm 79 (see Figs. 2 and 9) which is fixedly secured to the shaft 66 which carries the upper operating lever and projects horizontally therefrom. Said arm carries a pivot 80 on which is mounted a link 81 which carries a shaft 82 provided near its ends with rollers 83—84, as shown in Fig. 9. The rollers 83—84 travel in ways 85—86 provided in the members 64—65 of the upper operating lever, as shown in Fig. 3. Plates 87—88 are removably secured to the under surfaces of the members 64—65, thus providing for the ready removal of the shaft 82 and rollers. The shaft 82 is connected with the cross-head 69 by means of a yoke 89, one end of which is bifurcated and is connected with the shaft 82, its other end being pivotally connected by a pivot 90, shown in Fig. 2, to upwardly-projecting lugs 91—92 connected with the inner portion of the cross-head 69, as shown in Figs. 10, 11 and 12. The positions of these several parts are shown in Figs. 1 and 2, from which it will be seen that as the upper operating lever 65 is rocked upon its fulcrum 66 the several connections, acting upon the cross-head 69, act to swing the cross-head 69 back and forth with reference to the lever so as to maintain its vertical alinement with the several plunger rods connected with it.

I shall now describe the mechanism by which the upper and lower operating levers are rocked to reciprocate the several plunger rods.

93 indicates a drive-wheel in the form of a gear, which is mounted upon a stud 94 journaled in a suitable bearing 95 in the standard 68, shown in Figs. 2 and 4. The drive-wheel 93 is driven from any suitable source of power, as by a pinion 96 mounted on a shaft 97 and driven from a pulley 98, but any other suitable mechanism for the purpose may be employed.

99 indicates a crank, one end of which is connected eccentrically with the gear 93, its other end portion being journaled in a suitable bearing 100 carried by the standard 67, as shown in Fig. 4. The bearing 100 is concentric with the bearing 95 so that the stud 94, in effect, forms one end of a crank-shaft 99 upon which the gear 93 is concentrically mounted. As the crank-shaft 99 is fixedly secured at one end eccentrically to the gear 93, obviously when said gear rotates the crank-shaft is also rotated.

101 indicates a drum mounted upon one end of the crank-shaft 99 adjacent to the bearing 100, said drum being employed as a windlass for hoisting the plunger rods or well tubes out of the well or for lowering them into the same.

102—103 indicate swinging frames, which, as shown in Figs. 2 and 4, are mounted upon a shaft 104 pivotally supported at its ends in suitable bearings in the standards 67—68. The frames 102—103 are spaced a distance apart and extend in parallelism between the standards 67—68; their opposite or inner end portions being connected by links 105—106 to the members of the upper operating lever 64—65 by means of a shaft 107 which is carried at the inner ends of said members, as shown in Figs. 1 and 2. For adjustably securing the links 105—106 to the frames 102—103, I employ bolts 108—109 which extend through sleeves 110—111, as shown in Figs. 1 and 2. By adjusting the nuts on the end of the bolts 108—109, the frames 102—103 may be brought closer to or moved farther away from the ends of the operating lever to which they are connected. It will be apparent that by rocking the frames 102—103 about the pivot 104, the upper operating lever may be rocked to reciprocate the plunger rods connected to it. For this purpose the crank 99 is provided with two bearing-blocks 112—113 which fit into and travel longitudinally of the frames 102—103, said blocks being mounted upon the crank portion of the crank-shaft 99 in position to fit into said frames. Obviously, by the rotation of the crank-shaft said slide-blocks will travel back and forth in the frames in which they are fitted and will consequently rock said frames and operate the upper operating lever. It is evident, further, that when said slide-blocks move toward the pivot 104 the speed of the operating lever 64—65 will gradually increase, whereas, when they move in the opposite direction, the speed of said lever will gradually decrease.

114 indicates a similar frame which is mounted on a shaft 115 at the opposite side of the machine from the shaft 104 and is also fitted in suitable bearings in the standards 67—68. The frame 114 extends between the frames 102—103 and is connected by the link 56 with the lower operating lever 45—46. A bolt 116 serves as a means of adjustably connecting the link 56 with the lower operating lever.

117 indicates a slide-block similar to the slide-blocks 112—113, which is fitted in the frame 114 and is also mounted on the crank portion of the crank-shaft 99 so that it operates to rock the frame 114 as the crank-shaft rotates. In view of the fact that the frame 114 is pivoted at the opposite side of the machine from the pivot of the frames 102—103, however, this movement for a part of its cycle will be opposite to that of the frames 102—103. The proportion and adjustment of the parts is such that the up-stroke of each pump comprises about three-fifths of the time of a complete rotation, so that for a part of the time in each stroke both sets of plungers are moving simultaneously in an upward direction and consequently both are lifting water. This overlapping of the lifting action of the two sets of plungers provides for a continuous upward flow of water and avoids "water-hammer" due to the stopping and starting of the column of water, as is the case where an intermittently acting pump is employed.

My improved pumping mechanism is rendered more efficient by reason of the fact that as one set of plungers gradually slows up the other gradually increases its speed, thereby eliminating any shock from the operation of the plungers.

In order to reduce friction to the minimum in the slide-blocks 112—113 and 117, I employ the construction shown in Figs. 15 and 16, which illustrate the construction of the several slide-blocks. As therein shown, each slide-block comprises an annular hub portion 118 having a marginal flange 119 at one side and a plate 120 at the opposite side equal in diameter to the flanged portion of the hub 118. The hub portion 118 is of considerably less diameter than the internal width of the frames 102—103 and 114 to allow space for a series of anti-friction rollers 121, as shown in Figs. 15 and 16. At the end portions of the hub 118 curved filler-strips 122 are provided between the flange 119 and the outer margin of the plate 120 to hold the rollers in place. Said filler-strips are not long enough to interfere with the fitting of the slide-block between the side members of the frame in which it moves.

The plungers 37 and 38 being connected to the same plunger rod 26, operate in unison, and in like manner the uppermost plunger 36 operates in unison with the lowermost plunger 39. As has been described, during the greater part of the time, the upper and lower sets of plungers operate in opposition to each other, so that when, for example, the lowermost plunger 39 begins to rise the next higher plunger 38 will be descending and consequently the check-valve 32 of the latter will rise and permit water to be forced up by the plunger 39 through plunger 38 and also through plunger 37, which is moving in the same direction as plunger 38. Before the end of the upward stroke of the plunger 39, however, the plungers 37 and 38 will have reached their lowermost position and will begin to rise, all four plungers then lifting the water. As plungers 37—38 continues to rise, the plungers 36 and 39 will begin to descend, thereby forcing the water above plunger 37 up through plunger 36, the check-valve 40 of which will rise to permit the water to pass it. Before the plungers 37—38 reach the uppermost limit of their movement the plungers 36—39 will again begin to move upward so that all four plungers will again be moving upward at the same time. Thus the discharge of water from the well-tube will be a continuous one and the change in the direction of movement of the several plungers will be effected without shock. By providing the two sets of plungers as described, smaller plunger rods may be employed and danger of wearing out the well-tube by rubbing, hereinbefore referred to, is avoided. By making the plungers 38—39 of less capacity than the plungers 36—37 the strain on the plunger rods 32—26 is reduced.

In assembling the parts of the mechanism, the foundation is placed with the opening 20 over the well and the pumping mechanism is set on the foundation. The well-tube is then lowered into the well by the use of the drum 101, after which the plungers with their pumping rods are put in place. When repairs to the working parts in the well are required, such as renewing the leather packings, the upper and lower operating levers are removed, which provides room for unscrewing the sections of the plunger rods as they are removed from the well by means of a hoisting rope operated by the drum 101 and running over an ordinary pulley or other suitable device. When necessary, the upper end of the well-tube or discharge T 34 may be drawn up to the foundation plate and a new pipe added by simply withdrawing the screws 23 and removing the cap 24.

While I have described with considerable particularity the embodiment of my invention illustrated in the drawings, I wish it to be understood that I do not restrict myself to the specific construction therein shown, or described in the specification, except in so far as such construction is particularly claimed, my invention including generically the subject-matter of the broader claims.

No claim is made herein to the form of crank and lever power means as shown and claimed in Letters Patent of the United States granted to me on January 12, 1915, No. 1,124,295.

That which I claim as my invention, and desire to secure by Letters Patent, is,—

1. In a pump, the combination of a well-tube, a plurality of pairs of plungers mounted therein, means for operating the topmost plunger and the lowermost plunger in unison, and means for operating the intermediate plungers in unison, the plungers of each pair being adapted to coöperate to force water upward through said well-tube.

2. In a pump, the combination of a well-tube, a plurality of pairs of plungers mounted therein, means for operating the topmost plunger and the lowermost plunger in unison, and means for operating the intermediate plungers in unison, said operating means being adapted to start each plunger of each pair on its upward operative movement before the end of the upward operative movement of the other plunger of that pair.

3. In a pump, the combination of a well-tube, a plurality of pairs of plungers mounted therein, means for operating the topmost plunger and the lowermost plunger in unison, means for operating the intermediate plungers in unison, crank-mechanism for driving said operating means, and means for rotating said crank-mechanism, the operative upward stroke of each plunger of each pair being timed a half revolution of the crank behind the operative upward stroke of the other plunger of that pair.

4. In a pump, the combination of a well-tube, a tubular plunger-rod extending down into said well-tube, a second plunger-rod extending down into said well-tube within said tubular plunger-rod and extending below the lower end of said tubular plunger-rod, a plunger mounted in said well-tube and connected with said second plunger-rod, a second plunger fixed on said tubular plunger-rod in said well-tube in position to coöperate with said first-named plunger for forcing water upward through the well-tube, a third plunger fixed on said tubular plunger-rod in said well-tube a considerable distance above said second plunger, a fourth plunger mounted in said well-tube and connected to operate in unison with said second plunger-rod in position to coöperate with said third plunger for forcing water upward through the well-tube, and means for reciprocating said plunger-rods in opposite directions.

5. In a pump, the combination of a well-tube, a tubular plunger-rod extending down into said well-tube, a second plunger-rod extending down into said well-tube within said tubular plunger-rod and extending below the lower end of said tubular plunger-rod, a plunger mounted in said well-tube and connected with said second plunger-rod, a second plunger fixed on said tubular plunger-rod in said well-tube in position to coöperate with said first-named plunger for forcing water upward through the well-tube, a third plunger fixed on said tubular plunger-rod in said well-tube a considerable distance above said second plunger, a fourth plunger mounted in said well-tube a short distance above said third plunger and adapted to coöperate therewith for forcing water upward through the well-tube, a third plunger-rod extending down into said well-tube for operating said fourth plunger, and means for reciprocating said plunger-rods, said second and third plunger-rods being reciprocated in unison.

6. In a pump, the combination of a well-tube, upper and lower pairs of plungers in said well-tube, a tubular plunger-rod connected with the intermediate plungers, a second plunger-rod extending through said tubular rod and connected with the lowermost plunger, a third plunger connected with the uppermost plunger, and means for reciprocating said plunger-rods for moving the intermediate plungers in unison and for moving the other two plungers in unison, said reciprocating means being adapted to start each plunger of each of the upper and lower pairs on its upward operative movement before the end of the upward operative movement of the other plunger of that pair.

7. A pumping apparatus, comprising a tube, four plungers operating therein, means for reciprocating the intermediate plungers in unison, and means for reciprocating the uppermost and lowermost plungers so that at times they move in the same direction as the intermediate plungers and at other times in an opposite direction to the movement of the latter plungers.

8. A pumping apparatus, comprising a tube, four plungers operating therein, rocking levers for reciprocating the intermediate plungers in unison, and rocking levers for reciprocating the uppermost and lowermost plungers so that at times they move in the same direction as the intermediate plungers and at other times in an opposite direction to the movement of the latter plungers.

9. A pumping apparatus, comprising a tube, upper and lower sets of plungers therein, a tubular plunger rod connected with the intermediate plungers, a plunger rod extending through said tubular rod and connected with the lowermost plunger, plunger rods connected with the uppermost plunger, a lever for operating said tubular plunger rod, and a lever for operating the other plunger rods.

10. A pumping apparatus, comprising a tube, upper and lower sets of plungers therein, a tubular plunger rod connected with the intermediate plungers, a plunger rod extending through said tubular rod and connected with the lowermost plunger, plunger rods connected with the uppermost plunger, a lever for operating said tubular plunger rod, a lever for operating the other plunger rods, and common driving mechanism for said levers and acting to operate the same to lift said plungers in unison at certain times and at other times to move the intermediate plungers in an opposite direction to the other plungers.

11. A pumping apparatus, comprising upper and lower rocking levers, rocking members pivotally mounted on suitable supports and connected respectively with said levers for actuating the same, and a crank-shaft connected with said rocking members for actuating the same.

12. A pumping apparatus, comprising upper and lower rocking levers, rocking members each pivotally supported at one end portion thereof, said members being connected at their other end portions with said levers, respectively, a crank having sliding connections with said members, and means for rotating said crank.

13. A pumping apparatus, comprising upper and lower rocking levers, oppositely-disposed rocking members each pivotally supported at one end portion thereof, said members being connected at their other end portions with said levers, respectively, a crank having sliding connections with said members, and means for rotating said crank.

14. A pumping apparatus, comprising upper and lower rocking levers, oppositely-disposed rocking frames pivotally supported near one end and connected at their other ends, respectively, with said levers, a crank, means for rotating said crank, and slide-blocks mounted on said crank and moving in said frames for rocking the same.

15. A pumping apparatus, comprising upper and lower rocking levers, oppositely-disposed rocking frames pivotally supported near one end and connected at their other ends, respectively, with said levers, a crank, means for rotating said crank, and slide-blocks mounted on said crank and moving in said frames for rocking the same, said slide-blocks having anti-friction rollers which bear upon said frames.

16. A pumping apparatus, comprising upper and lower rocking levers, oppositely-disposed rocking frames pivotally supported near one end and connected at their other ends, respectively, with said levers, a gear, means for rotating said gear, a crank eccentrically connected with said gear, and slide-blocks mounted on said crank and operating on said frames for rocking the same.

17. A pumping apparatus, comprising an operating lever, a swinging fulcrum supporting said lever at one end, a guide for said lever, a rocking member pivotally supported at one end and having its other end portion connected with said lever, and means for rocking said member to actuate said lever.

18. A pumping apparatus, comprising upper and lower operating levers, a swinging fulcrum supporting said lower lever near one end, a guide for said lower lever, a swinging member connected with said lower lever for actuating the same, an upper lever fulcrumed between its ends, a rocking member connected with one end portion of said upper lever, and means for actuating said rocking members.

19. A pumping apparatus, comprising upper and lower operating levers, a swinging fulcrum supporting said lower lever near one end, a guide for said lower lever, a swinging member connected with said lower lever for actuating the same, an upper lever fulcrumed between its ends, a rocking member connected with one end portion of said upper lever, said rocking members being oppositely disposed, and means for actuating said rocking members.

20. A pumping apparatus, comprising upper and lower operating levers, a swinging fulcrum supporting said lower lever near one end, a guide for said lower lever, a swinging member connected with said lower lever for actuating the same, an upper lever fulcrumed between its ends, a rocking member connected with one end portion of said upper lever, said rocking members being oppositely disposed, a crank having slide-blocks operating on said rocking members, and means for rotating said crank.

21. A pumping apparatus, comprising a suitable support, a rocking lever fulcrumed between its ends, a cross-head, a plunger rod, swinging links connected with said cross-head and with said lever, and means actuated by the rocking of said lever for swinging said cross-head to maintain its vertical alinement with said plunger rod.

22. A pumping apparatus, comprising a suitable support, a rocking lever fulcrumed between its ends, a cross-head, a plunger rod, swinging links connected with said cross-head and with said lever, and means actuated by the rocking of said lever for swinging said cross-head to maintain its vertical alinement with said plunger rod, comprising a stationary arm, a swinging link carried by said arm and actuated by the rocking of said lever, and a connection between the latter link and said cross-head.

23. In a pump, the combination of a lever, means for swinging said lever, a link pivotally connected at one end with said lever, and means actuated by the swinging of said lever for causing the other end of said link to move in right lines.

24. In a pump, the combination of a lever, means for swinging said lever, a link pivotally connected with said lever, a piston-rod connected with said link eccentrically relative to the axis of said link on said lever, and means actuated by the swinging of said lever for swinging said link relative to said lever for causing the connection between said link and said piston-rod to move in right lines.

25. In a pump, the combination of a lever, means for swinging said lever, a link pivotally connected with said lever, power-transmitting means for connecting said link with the part to be actuated, a bar operatively connected with said link eccentrically of the axis of said link on said lever, said bar extending toward the axis upon which said lever is mounted, a second bar pivotally connected with said first-named bar at the end thereof nearer adjacent to the axis of said lever, said second bar extending away from the axis of said lever, stationary means to which said second bar is pivotally connected, and sliding connections between said two bars and said lever, the arrangement being such that the said power-transmitting means carried by said link move in right lines as said lever is swung.

26. In a deep well pump, the combination of two sets of pump plungers placed in the same water column pipe down in a well and at a considerable distance apart, upper and lower operating levers, and four plunger rods, one a hollow rod operated by the lower lever and operating the top plunger of the lower set and the bottom plunger of the upper set, another being a rod within said hollow rod and connected with the bottom plunger of the lower set and operated by the upper operating lever, and the other rods being connected to the top plunger of the upper set and also operated by the upper operating lever.

27. A pump, comprising two sets of plungers, one set being placed below the other down in the well in the same continuous line of well pipe, the lower set being of less capacity than the upper set, two pumping levers, and operating mechanism therefor, one of said sets of plungers operating to pump the water part of the distance and the other to pump the water the remaining distance.

28. In a pump, the combination of a well-tube, a plurality of sets of plungers in said well-tube one above the other, and means for operating said plungers for forcing water successively from one to another of said sets of plungers in said well-tube, each set of plungers being adapted to act independently of the other set.

29. In a pump, the combination of a well-tube, two sets of plungers in said well-tube one set located near the bottom of the well and the other set located near the surface, and means for operating said plungers in proper timed relation to each other for causing said two sets of plungers to act successively upon the water for forcing it upward through the well-tube.

30. A well pump, comprising two sets of plungers operating in the well tube, one set being a considerable distance below the other, upper and lower pumping levers, a rod connecting the upper lever and the bottom plunger of the lower set, rods connecting the upper lever to the top plunger of the upper set, and a rod connecting the lower lever with the intermediate plungers.

31. In a pumping mechanism, the combination of two members pivotally mounted and oppositely disposed with reference to each other, one of said members being bifurcated and the other being placed between the parts thereof, said members having ways for the movement of journal boxes, journal boxes mounted to slide on said members, a crank journaled in said journal boxes, means whereby said crank may be rotated, pumps, operating levers for operating said pumps, and means connecting said members with said operating levers for operating the pumps in opposite directions part of the time and in the same direction part of the time.

32. In a well pump operating a plurality of plunger rods and pump plungers, the combination of a crank having a driving gear secured to one of the arms thereof, a pinion for driving said gear, members pivoted opposite each other, one of said members being bifurcated and the other member being arranged to swing between the parts of said bifurcated member, means connecting the crank with said members for rocking the same, and means connecting the free ends of said members with the plunger rods for actuating the same.

33. In a pump, the combination of a plurality of pump rods and plungers, swinging members pivotally mounted at one end and arranged opposite to each other, operating levers, links connecting said operating levers with the free ends of said swinging members, said pump rods being connected with said levers, bearing blocks having roller bearings fitted to slide upon said swinging members, and a crank fitted in the bearing blocks of the several swinging members whereby said operating levers are actuated by a single crank.

34. In a pump, the combination of a plurality of pump rods and plungers, swinging members pivotally mounted at one end and arranged opposite to each other, operating levers, links connecting said operating levers with the free ends of said swinging members, said pump rods being connected with said levers, bearing blocks having roller bearings fitted to slide upon said swinging members, a crank fitted in the bearing blocks of the several swinging members whereby said operating levers are actuated by a single crank, a single drive gear for rotating said crank, and a pinion for driving said gear.

MATTHEW T. CHAPMAN.

Witnesses:
 JOHN L. JACKSON,
 MINNIE A. HUNTER.